United States Patent
Youn

(10) Patent No.: US 11,189,965 B2
(45) Date of Patent: Nov. 30, 2021

(54) CHARGING DEVICE

(71) Applicant: PORTMAG CO., LTD., Suwon-si (KR)

(72) Inventor: Tae Sik Youn, Seoul (KR)

(73) Assignee: PORTMAG CO., LTD.

( * ) Notice: Subject to any disclaimer, the term of this patent is extended or adjusted under 35 U.S.C. 154(b) by 0 days.

(21) Appl. No.: 17/167,634

(22) Filed: Feb. 4, 2021

(65) Prior Publication Data

US 2021/0159637 A1    May 27, 2021

Related U.S. Application Data

(63) Continuation of application No. PCT/KR2019/008427, filed on Jul. 9, 2019.

(30) Foreign Application Priority Data

Aug. 8, 2018 (KR) .......................... 10-2018-0092608

(51) Int. Cl.
*H01R 13/62* (2006.01)
*H01R 11/30* (2006.01)
*H01R 24/62* (2011.01)

(52) U.S. Cl.
CPC ......... *H01R 13/6205* (2013.01); *H01R 11/30* (2013.01); *H01R 24/62* (2013.01)

(58) Field of Classification Search
CPC ..... H01R 13/6205; H01R 11/30; H01R 24/62
USPC .......................................................... 439/74
See application file for complete search history.

(56) References Cited

U.S. PATENT DOCUMENTS

| | | | | |
|---|---|---|---|---|
| 7,375,494 | B2 * | 5/2008 | Daniel | H01M 10/48 320/112 |
| 7,628,655 | B1 * | 12/2009 | Chen | H01R 12/721 439/60 |
| D645,817 | S * | 9/2011 | Sasada | D13/108 |
| 8,292,664 | B2 * | 10/2012 | Funamura | H01R 12/721 439/607.31 |
| 9,723,877 | B2 * | 8/2017 | Wong | A24F 40/40 |
| 9,918,385 | B2 * | 3/2018 | Harashima | H01R 24/62 |
| 10,109,966 | B2 * | 10/2018 | Tsai | H01R 13/6581 |
| 2006/0073717 | A1 * | 4/2006 | Ng | H01R 35/04 439/131 |

FOREIGN PATENT DOCUMENTS

| | | |
|---|---|---|
| JP | 2009-187953 A | 8/2009 |
| KR | 20-0397426 Y1 | 9/2005 |
| KR | 10-2012-0080924 A | 7/2012 |
| KR | 10-2013-0042253 A | 4/2013 |
| KR | 10-2014-0013773 A | 2/2014 |
| KR | 10-2016-0061013 A | 5/2016 |
| KR | 10-2017-0024359 A | 3/2017 |
| KR | 20-0482852 Y1 | 3/2017 |
| KR | 10-1873853 B1 | 7/2018 |

* cited by examiner

*Primary Examiner* — Alexander Gilman
(74) *Attorney, Agent, or Firm* — Fay Sharpe LLP

(57) ABSTRACT

Disclosed is a charging device including: a main body part having one end at which a first terminal part is provided, and the other end to which a cable is connected; and a connection part having one end at which a second terminal part configured to be connected to the first terminal part is provided, and the other end at which a third terminal part configured to be connected to an electronic device is provided, in which the main body part and the connection part are detachably coupled by a magnet.

8 Claims, 9 Drawing Sheets

[Fig. 1]
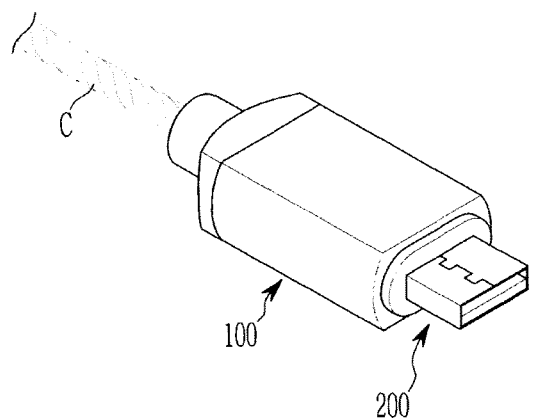

[Fig. 2]
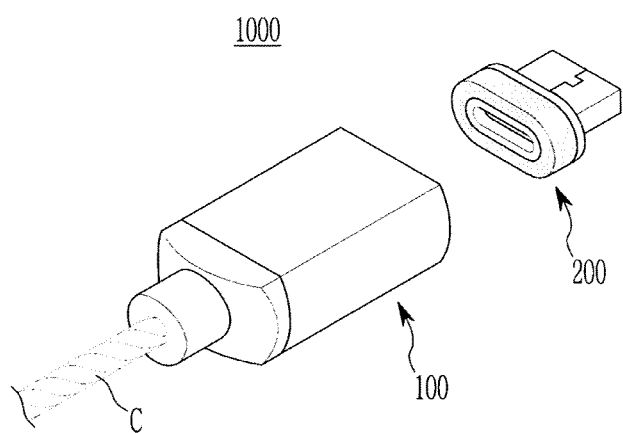

[Fig. 3]
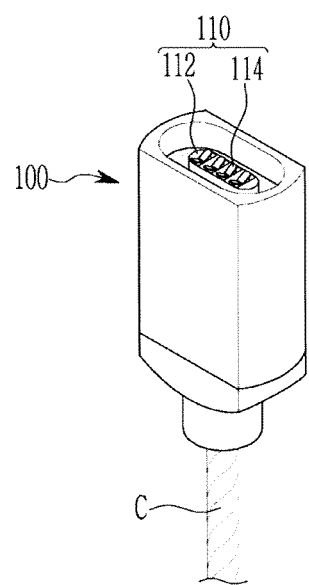

[Fig. 4]
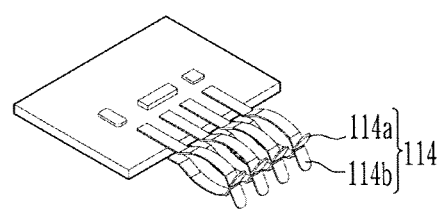

[Fig. 5]
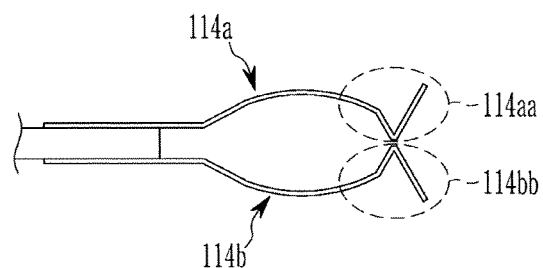

[Fig. 6]
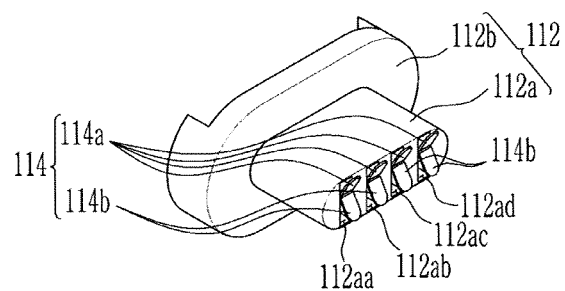

[Fig. 7]
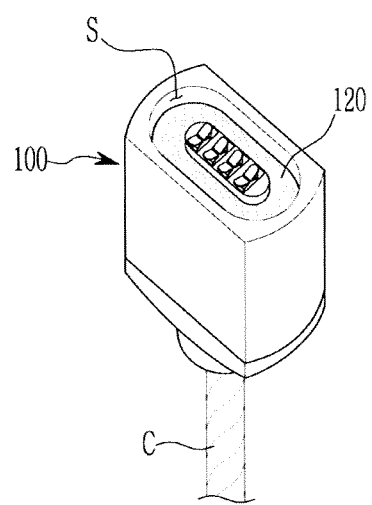

[Fig. 8]
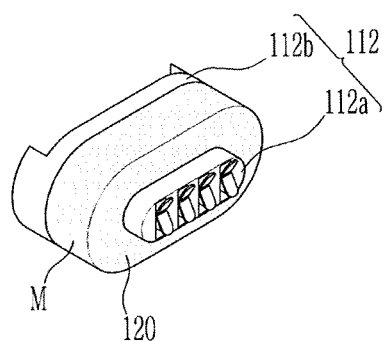

[Fig. 9]
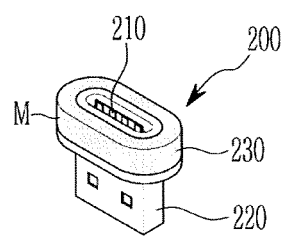
(a)
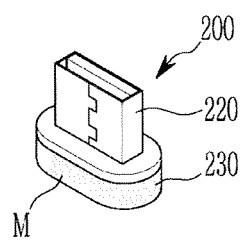
(b)

CHARGING DEVICE

CROSS-REFERENCE TO RELATED APPLICATIONS

This application is a continuation application of International Application No. PCT/KR2019/008427, filed on Jul. 9, 2019, which claims the benefit of Korean Application No. 10-2018-0092608, filed on Aug. 8, 2018, now Korean Patent No. 10-241573, granted Oct. 29, 2019, the contents of which are all hereby incorporated by reference herein in their entirety.

TECHNICAL FIELD

The present invention relates to a charging device, and more particularly, to a charging device in which a plurality of pairs of terminals in a main body part is manufactured in a state of being disposed in a housing and then installed in the charging device together with the housing, such that a manufacturing process may be simplified, production costs may be reduced, elastic force made by curved shapes of a first gripping portion and a second gripping portion of a terminal may reduce a likelihood of damage even in case of frequent separation, and the main body part and a connection part may be easily separated and coupled by means of a magnet.

BACKGROUND ART

A charging device in the related art is provided with a plurality of pogo pin-type terminals. There is inconvenience in assembling the charging device having the pogo pin-type terminals because the pogo pin-type terminals need to be separately manufactured and then arranged in the charging device, and this complicated process causes a problem of an increase in production costs.

In addition, even though only one of the plurality of pogo pin-type terminals installed in the charging device is defective, only the defective terminal cannot be replaced, and all the plurality of pogo pin-type terminals need to be replaced, which causes inconvenience.

In addition, because the pogo pin-type terminal has a straight shape, there is a problem in that a damage rate of the pogo pin-type terminal is high and durability of the pogo pin-type terminal deteriorates when the pogo pin-type terminal is frequently separated.

In addition, there are problems in that sparks may occur when dust is accumulated in a contact area between the pogo pin-type terminal and a connection terminal, the pogo pin-type terminal may be rusted when moisture is attached to the pogo pin-type terminal, and the charging device may be burnt out due to heat generated by the pogo pin-type terminal.

DISCLOSURE

Technical Problem

The present invention has been made in an effort to solve the above-mentioned problems, and an object of the present invention is to provide a charging device in which a plurality of pairs of terminals in a main body part is manufactured in a state of being disposed in a housing and then installed in the charging device together with the housing, such that a manufacturing process may be simplified, production costs may be reduced, and elastic force made by curved shapes of a first gripping portion and a second gripping portion of a terminal may reduce a likelihood of damage even in case of frequent separation and make it easy to remove the main body part.

In addition, another object of the present invention is to provide a charging device in which a main body part and a connection part may be easily separated and coupled by a magnet, thereby improving convenience of use.

Technical Solution

In order to achieve the above-mentioned objects, a charging device according to the present invention includes: a main body part having one end at which a first terminal part is provided, and the other end to which a cable is connected; and a connection part having one end at which a second terminal part configured to be connected to the first terminal part is provided, and the other end at which a third terminal part configured to be connected to an electronic device is provided, in which the main body part and the connection part are detachably coupled by a magnet.

The magnet may be provided in at least one of the main body part and the connection part.

The first terminal part may include: a housing; and a plurality of pairs of terminals received in the housing, each of the pairs of terminals may be positioned so that the two terminals face each other, and a first gripping portion and a second gripping portion may be formed at ends of the two terminals, respectively.

The first gripping portion and the second gripping portion may be curved such that the first gripping portion and the second gripping portion become close to each other to a predetermined position and then become distant from each other after the predetermined position.

The housing may include: a receiving portion configured to receive the plurality of pairs of terminals; and an extension portion stepped downward from the receiving portion and extending outward from the receiving portion.

The receiving portion may be divided into a plurality of regions, and each of the regions may receive each pair of terminals.

The main body part may further include a seating part positioned on the extension portion of the housing.

The magnet may be provided in the seating part.

The connection part may further include a fitting part spaced apart from the second terminal part and provided in a circumferential direction of the second terminal part.

The magnet may be provided in the fitting part.

Advantageous Effects

According to the present invention, the plurality of pairs of terminals in the main body part is manufactured in a state of being disposed in the housing and then installed in the charging device together with the housing, and as a result, there is an advantage in that the manufacturing process is simplified and the production cost is reduced.

In addition, the first gripping portion and the second gripping portion of each of the plurality of terminals in the main body part are curved such that the first gripping portion and the second gripping portion become close to each other to a predetermined position and then become distant from each other after the predetermined position, and the second terminal part of the connection part is fitted into the plurality of terminals in this state, and as a result, there is an advantage in that the elastic force of the first gripping portion and the second gripping portion makes it easy to remove the main body part even though force is supplied in any direction to remove the main body part from the connection part.

In addition, the elastic force made by the curved shapes of the first gripping portion and the second gripping portion advantageously reduce a likelihood of damage even though the main body part and the connection part are frequently separated.

In addition, the configuration in which the main body part and the connection part are detachably coupled by the magnet enables the main body part and the connection part to be easily separated and coupled, thereby improving convenience of use.

DESCRIPTION OF DRAWINGS

FIG. 1 is a view schematically illustrating a charging device according to an exemplary embodiment of the present invention.

FIG. 2 is a view schematically illustrating a state in which the charging device illustrated in FIG. 1 is disassembled.

FIG. 3 is a view schematically illustrating a main body part of the charging device according to the exemplary embodiment of the present invention.

FIG. 4 is a view schematically illustrating a state in which terminals in the main body part of the charging device according to the exemplary embodiment of the present invention are connected to a board.

FIG. 5 is a view schematically illustrating a side cross section of the terminal illustrated in FIG. 4.

FIG. 6 is a view schematically illustrating a housing in the main body part of the charging device according to the exemplary embodiment of the present invention.

FIG. 7 is an enlarged view of the main body part of the charging device according to the exemplary embodiment of the present invention.

FIG. 8 is a view schematically illustrating a state in which a seating part is coupled to the housing in the main body part of the charging device according to the exemplary embodiment of the present invention.

FIG. 9 is a view schematically illustrating a connection part of the charging device according to the exemplary embodiment of the present invention.

BEST MODE

It should be noted that technical terms used in the present specification are used to just describe a specific exemplary embodiment and do not intend to limit the present invention. Further, unless the technical terms used in the present specification are particularly defined as other meanings in the present specification, the technical terms should be interpreted as meanings generally appreciated by those skilled in the art and should not be interpreted as excessively comprehensive meanings or excessively reduced meanings. Further, when the technical term used in the present specification is a wrong technical term that does not accurately express the spirit of the present invention, the technical term should be understood by being substituted by a technical term which can be correctly understood by those skilled in the art.

In addition, a general term used in the present invention should be interpreted as defined in a dictionary or contextually and should not be interpreted as an excessively reduced meaning.

In addition, singular expressions used in the present specification include plural expressions unless clearly described as different meanings in the context. It should not be interpreted that the terms "comprises," "comprising," "includes" and/or "including," used herein necessarily include all of the several constituent elements or several steps disclosed in the present specification, and it should be interpreted that the terms may not include some of the constituent elements or steps and may further include additional constituent elements or steps.

Hereinafter, the present invention will be described in more detail with reference to the exemplary embodiments, but the scope of the present invention is not limited to the following exemplary embodiments.

FIG. 1 is a view schematically illustrating a charging device according to an exemplary embodiment of the present invention. FIG. 2 is a view schematically illustrating a state in which the charging device illustrated in FIG. 1 is disassembled.

Referring to FIGS. 1 and 2, a charging device 1000 according to the present invention includes a main body part 100 and a connection part 200.

The main body part 100 and the connection part 200 may be kept coupled to each other during a charging operation, and the main body part 100 and the connection part 200 may be separated from each other when the charging operation is not performed.

Specifically, the main body part 100 and the connection part 200 are coupled to each other by magnetic force during the charging operation. The main body part 100 and the connection part 200 may be separated from each other when external force stronger than the magnetic force is applied. That is, the main body part 100 and the connection part 200 of the charging device 1000 according to the present invention may be detachably coupled to each other by a magnet.

MODE FOR INVENTION

FIG. 3 is a view schematically illustrating the main body part of the charging device according to the exemplary embodiment of the present invention. FIG. 4 is a view schematically illustrating a state in which terminals in the main body part of the charging device according to the exemplary embodiment of the present invention are connected to a board. FIG. 5 is a view schematically illustrating a side cross section of the terminal illustrated in FIG. 4.

Referring to FIGS. 3 to 5, the main body part 100 of the charging device according to the exemplary embodiment of the present invention has one end at which a first terminal part 110 is provided, and the other end to which a cable C is connected.

The first terminal part 110 includes a housing 112 and a plurality of pairs of terminals 114 received in the housing 112.

In this case, each pair of terminals is positioned so that a first terminal 114*a* and a second terminal 114*b* face each other.

A first gripping portion 114*aa* is formed at one end of the first terminal 114*a*, and a second gripping portion 114*bb* is formed at one end of the second terminal 114*b*.

The first gripping portion 114*aa* and the second gripping portion 114*bb* are curved such that the first gripping portion 114*aa* and the second gripping portion 114*bb* become close to each other to a predetermined position and then become distant from each other after the predetermined position.

The curved shapes provide elastic force, thereby making it easy to connect the first terminal part 110 to a second terminal part 210 (see FIG. 9) to be described below or separate the first terminal part 110 from the second terminal part 210, and achieving an effect of reducing a damage rate even in case of frequent separation.

FIG. 6 is a view schematically illustrating the housing in the main body part of the charging device according to the exemplary embodiment of the present invention.

Referring to FIGS. 3 and 6, the housing 112 in the main body part of the charging device according to the exemplary embodiment of the present invention includes a receiving portion 112a and an extension portion 112b.

The receiving portion 112a is divided into a plurality of regions 112aa, 112ab, 112ac, and 112ad to receive the plurality of pairs of terminals 114. The first terminal 114a and the second terminal 114b, which are each pair of terminals, are received in each of the regions 112aa, 112ab, 112ac, and 112ad.

The extension portion 112b is stepped downward from the receiving portion 112a and extends outward from the receiving portion 112a.

According to the present invention, the plurality of pairs of terminals 114 is not assembled after being individually disposed in the charging device. However, the plurality of pairs of terminals 114 is manufactured in a state of being disposed in the housing 112 and then installed in the charging device together with the housing 112. Therefore, it is possible to achieve an effect of simplifying the manufacturing process and reducing the production costs.

FIG. 7 is an enlarged view of the main body part of the charging device according to the exemplary embodiment of the present invention. FIG. 8 is a view schematically illustrating a state in which a seating part is coupled to the housing in the main body part of the charging device according to the exemplary embodiment of the present invention.

Referring to FIGS. 7 and 8, the main body part 110 of the charging device according to the exemplary embodiment of the present invention may further include a seating part 120 positioned on the extension portion 112b of the housing 112.

More specifically, the seating part 120 is positioned on the extension portion 112b so as to surround the receiving portion 112a of the housing 112. The seating part 120 has a through portion, such that a part of the receiving portion 112a protrudes to the outside through the through portion.

In addition, a magnet M is provided in the seating part 120. The magnet M enables the main body part 100 to be detachably coupled to the connection part 200 (see FIG. 9) to be described below.

FIG. 9 is a view schematically illustrating the connection part of the charging device according to the exemplary embodiment of the present invention.

Referring to FIG. 9, the connection part 200 of the charging device according to the exemplary embodiment of the present invention includes the second terminal part 210 and a third terminal part 220.

The second terminal part 210 is provided at one end of the connection part 200 and connected to the first terminal part 110 (see FIG. 3) during the charging operation.

The third terminal part 220 is provided at the other end of the connection part 200 and connected to an electronic device required to be charged.

The connection part 200 may further include a fitting part 230.

The fitting part 230 is spaced apart from the second terminal part 210 and provided in a circumferential direction of the second terminal part 210.

A magnet M is provided in the fitting part 230. The magnet M enables the second terminal part 210 to be detachably coupled to the first terminal part 110 (see FIG. 3) of the main body part 100 as described above.

In the present exemplary embodiment, the magnets M are provided in both the seating part 120 of the main body part 100 and the fitting part 230 of the connection part 200. However, in another exemplary embodiment, the magnet may be provided in any one of the main body part 100 and the connection part 200.

Since the magnets are provided in the charging device according to the present invention as described above, the main body part and the connection part may be detachably coupled to each other, and as a result, it is possible to achieve an effect of improving convenience of use.

An operation of the charging device according to the present invention will be described below.

The main body part 100 and the connection part 200 of the charging device according to the present invention are coupled to each other by magnetic force during the operation of charging the electronic device.

More specifically, the fitting part 230 of the connection part 200 is inserted into a space S (see FIG. 7) of the main body part 100 and coupled to the seating part 120 of the main body part 100 in a state in which the fitting part 230 is in contact with the seating part 120.

In this case, the second terminal part 210 of the connection part 200 is connected to the first terminal part 110 of the main body part 100, and more specifically, the second terminal part 210 is fitted between the first gripping portions 114aa and the second gripping portions 114bb of the plurality of pairs of terminals 114, thereby implementing electrical connection.

When the electronic device is not charged, for example, when a user needs to stop the charging operation to answer a phone call from the outside, the user may separate the main body part 100 from the connection part 200 with force stronger than the magnetic force. In this case, the strong force may be applied to the main body part 100 in various directions. Even though the strong force is applied in any direction, the elastic force made by the curved shape of the first gripping portion 114aa and the curved shape of the second gripping portion 114bb makes it easy to separate the main body part 100 and advantageously reduces the likelihood of damage to connected portions even in case of frequent separation.

While the specific exemplary embodiments of the present invention have been described above, the present invention is not limited to the specific exemplary embodiments described above, various modifications can of course be made by any person skilled in the art to which the present invention pertains without departing from the subject matter of the present invention as claimed in the claims, and the modifications are within the scope defined by the claims.

100: Main body part
110: First terminal part
112: Housing
112a: Receiving portion
112aa: First region
112ab: Second region
112ac: Third region
112ad: Fourth region
112b: Extension portion
114: Terminal
114a: First terminal
114aa: First gripping portion
114b: Second terminal
114bb: Second gripping portion
120: Seating part 122: Opening portion
200: Connection part
210: Second terminal part
220: Third terminal part
230: Fitting part
M: Magnet

INDUSTRIAL APPLICABILITY

The present invention relates to a device for charging, and the device may be used as a charging device in which the plurality of pairs of terminals in the main body part is manufactured in a state of being disposed in the housing and then installed in the charging device together with the housing, such that the manufacturing process may be simplified, the production cost may be reduced, the elastic force made by the curved shapes of the first gripping portion and the second gripping portion of the terminal may reduce a likelihood of damage even in case of frequent separation, and the main body part and the connection part may be easily separated and coupled by means of the magnet.

The invention claimed is:

1. A charging device comprising:
 a main body part having one end at which a first terminal part is provided, and the other end to which a cable is connected; and
 a connection part having one end at which a second terminal part configured to be connected to the first terminal part is provided, and the other end at which a third terminal part configured to be connected to an electronic device is provided,
 wherein the main body part and the connection part are detachably coupled by a magnet,
wherein the first terminal part includes a housing, and a plurality of pairs of terminals received in the housing,
wherein each of the pairs of terminals is positioned so that a first terminal faces with a second terminal each other,
wherein the first and second terminals, respectively:
 includes a first body part and a second body part having a convex shape in the outward direction, and includes a first gripping portion and a second gripping portion,
wherein the first and second gripping portions:
 are extended from the first and second body parts respectively, and are curved such that the first gripping portion and the second gripping portion touch each other to a predetermined position and then become distant from each other after the predetermined position,
 wherein, when the connected first and second terminals are separated, the second terminal is separated from the first terminal without contact with the first and second body parts of the first terminal, so that a damage of the second terminal is prevented even if a separating force in a vertical direction is applied.

2. The charging device of claim 1, wherein the magnet is provided in at least one of the main body part and the connection part.

3. The charging device of claim 1, wherein the housing includes:
 a receiving portion configured to receive the plurality of pairs of terminals; and
 an extension portion stepped downward from the receiving portion and extending outward from the receiving portion.

4. The charging device of claim 3, wherein the receiving portion is divided into a plurality of regions, and each of the regions receives the each pair of terminals.

5. The charging device of claim 3, wherein the main body part further includes a seating part positioned on the extension portion of the housing.

6. The charging device of claim 5, wherein the magnet is provided in the seating part.

7. The charging device of claim 3, wherein the connection part further includes a fitting part spaced apart from the second terminal part and provided in a circumferential direction of the second terminal part.

8. The charging device of claim 7, wherein the magnet is provided in the fitting part.

* * * * *